United States Patent
Mueller et al.

(10) Patent No.: US 10,753,126 B2
(45) Date of Patent: Aug. 25, 2020

(54) LOCK SYSTEM FOR A MOTOR VEHICLE

(71) Applicant: Huf Huelsbeck & Fuerst GmbH & Co. KG, Velbert (DE)

(72) Inventors: Dirk Mueller, Essen (DE); Mirko Schindler, Velbert (DE); Coen Dieker, VW Dinxperlo (NL); Thorsten Torkowski, Herne (DE); Marco Rosenbaum, Meerbusch (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 553 days.

(21) Appl. No.: 15/315,561

(22) PCT Filed: May 21, 2015

(86) PCT No.: PCT/EP2015/061222
§ 371 (c)(1),
(2) Date: Dec. 1, 2016

(87) PCT Pub. No.: WO2015/185364
PCT Pub. Date: Dec. 10, 2015

(65) Prior Publication Data
US 2018/0187461 A1     Jul. 5, 2018

(30) Foreign Application Priority Data

Jun. 5, 2014    (DE) .......... 10 2014 107 986

(51) Int. Cl.
*E05B 81/76* (2014.01)
*E05B 81/16* (2014.01)
(Continued)

(52) U.S. Cl.
CPC .............. *E05B 81/76* (2013.01); *B60R 25/01* (2013.01); *B60R 25/24* (2013.01);
(Continued)

(58) Field of Classification Search
CPC .......... E05B 81/76; E05B 81/77; E05B 81/78; E05B 47/0012; E05B 77/44; E05B 81/06;
(Continued)

(56) References Cited

U.S. PATENT DOCUMENTS 4,041,301 A * 8/1977 Pelchat .................. B60Q 1/323
315/84
4,892,342 A * 1/1990 Newman ................. E05B 79/06
292/336.3

(Continued)

FOREIGN PATENT DOCUMENTS

EP     0 860 565 A1    8/1998
EP     1 096 085 A1    5/2001
(Continued)

OTHER PUBLICATIONS

International Preliminary Search Report on Patentability of International Application No. PCT/EP2015/061222, dated Dec. 15, 2016, 7 pages.

(Continued)

*Primary Examiner* — Kristina R Fulton
*Assistant Examiner* — Faria F Ahmad
(74) *Attorney, Agent, or Firm* — Fay Sharpe LLP

(57) ABSTRACT

A lock system for a motor vehicle includes a handle for opening a door or hatch, a drive device coupled to the handle, and a control device which is suited for checking an access code of a mobile ID transmitter, coupled to the drive device. A lock device is provided for the door or hatch. The handle can move between a non-use position in which it is flush with an outer contour of the door or hatch and an opening position in which it protrudes at least in part from the outer contour. The drive device is coupled and designed for opening or closing the door or hatch such that it moves along a movement path along which the drive device (Continued)

extends the handle into its opening position or retracts it into its non-use position, as well as actuating the lock device.

10 Claims, 1 Drawing Sheet

(51) Int. Cl.
| | |
|---|---|
| *E05B 85/10* | (2014.01) |
| *E05B 81/12* | (2014.01) |
| *B60R 25/01* | (2013.01) |
| *B60R 25/24* | (2013.01) |
| *E05B 47/00* | (2006.01) |
| *E05B 77/44* | (2014.01) |
| *E05B 81/06* | (2014.01) |
| *E05B 81/56* | (2014.01) |
| *E05B 83/18* | (2014.01) |
| *E05B 83/36* | (2014.01) |
| *E05B 81/14* | (2014.01) |

(52) U.S. Cl.
CPC .......... *E05B 47/0012* (2013.01); *E05B 77/44* (2013.01); *E05B 81/06* (2013.01); *E05B 81/13* (2013.01); *E05B 81/16* (2013.01); *E05B 81/56* (2013.01); *E05B 83/18* (2013.01); *E05B 83/36* (2013.01); *E05B 85/107* (2013.01); *E05B 81/14* (2013.01); *E05B 2047/002* (2013.01); *E05B 2047/0024* (2013.01); *E05B 2047/0067* (2013.01); *E05Y 2201/434* (2013.01); *E05Y 2201/638* (2013.01); *E05Y 2201/71* (2013.01); *E05Y 2400/44* (2013.01); *E05Y 2400/45* (2013.01); *E05Y 2400/85* (2013.01); *E05Y 2800/176* (2013.01); *E05Y 2900/531* (2013.01); *E05Y 2900/546* (2013.01)

(58) Field of Classification Search
CPC .......... E05B 81/13; E05B 81/16; E05B 81/56; E05B 83/18; E05B 83/36; E05B 85/107; E05B 81/14; E05B 2047/002; E05B 2047/0024; E05B 5/00; E05B 5/003; E05B 5/006; E05B 2047/0094; E05B 83/24; E05B 83/243; B60R 25/01; B60R 25/24; Y10T 292/57; Y10T 292/1082; Y10T 292/1047; Y10S 292/03
See application file for complete search history.

(56) References Cited

U.S. PATENT DOCUMENTS

| | | | | |
|---|---|---|---|---|
| 5,497,641 | A * | 3/1996 | Linde | E05B 81/14 |
| | | | | 180/289 |
| 6,036,244 | A * | 3/2000 | Tyves | E05B 85/12 |
| | | | | 292/336.3 |
| 6,084,317 | A * | 7/2000 | Wolfe | G07C 9/00182 |
| | | | | 180/287 |
| 7,005,959 | B2 * | 2/2006 | Amagasa | E05B 81/78 |
| | | | | 307/10.1 |
| 8,746,755 | B2 * | 6/2014 | Papanikolaou | E05B 81/14 |
| | | | | 292/201 |
| 8,786,401 | B2 * | 7/2014 | Sobecki | E05B 85/103 |
| | | | | 340/5.72 |
| 9,151,085 | B2 * | 10/2015 | Papanikolaou | E05B 81/06 |
| 9,580,942 | B2 * | 2/2017 | Sobecki | E05B 85/103 |
| 2004/0031301 | A1 | 2/2004 | Dominique | E05B 41/00 |
| | | | | 70/237 |
| 2004/0070489 | A1 * | 4/2004 | Ueda | E05B 85/01 |
| | | | | 340/5.61 |
| 2008/0163555 | A1 * | 7/2008 | Thomas | E05B 85/10 |
| | | | | 49/460 |
| 2010/0007463 | A1 * | 1/2010 | Dingman | B60Q 1/2669 |
| | | | | 340/5.72 |
| 2011/0148575 | A1 * | 6/2011 | Sobecki | E05B 85/103 |
| | | | | 340/5.64 |
| 2013/0076048 | A1 * | 3/2013 | Aerts | E05B 85/103 |
| | | | | 292/336.3 |
| 2014/0132012 | A1 * | 5/2014 | Yoshino | E05B 85/103 |
| | | | | 292/336.3 |
| 2014/0265372 | A1 * | 9/2014 | Smart | E05B 85/103 |
| | | | | 292/336.3 |
| 2014/0327252 | A1 * | 11/2014 | Sobecki | E05B 85/103 |
| | | | | 292/336.3 |
| 2015/0059424 | A1 * | 3/2015 | Hunt | E05B 81/76 |
| | | | | 70/262 |
| 2015/0233154 | A1 * | 8/2015 | Smart | E05B 81/28 |
| | | | | 70/237 |
| 2016/0083995 | A1 * | 3/2016 | Dezorzi | E05F 15/73 |
| | | | | 340/5.72 |
| 2016/0281397 | A1 * | 9/2016 | Park | E05B 85/107 |
| 2016/0369537 | A1 * | 12/2016 | Rocci | E05B 85/107 |
| 2017/0008488 | A1 * | 1/2017 | Matsumoto | H04W 12/06 |
| 2017/0019480 | A1 * | 1/2017 | Yokota | B60R 25/2036 |
| 2017/0098292 | A1 * | 4/2017 | Odejerte, Jr. | B60R 25/20 |
| 2017/0260780 | A1 * | 9/2017 | Christensen | E05B 81/77 |
| 2018/0058113 | A1 * | 3/2018 | Han | E05B 79/20 |
| 2018/0058114 | A1 * | 3/2018 | Brown | E05B 81/90 |
| 2018/0106082 | A1 * | 4/2018 | Brown | E05B 85/107 |
| 2018/0148957 | A1 * | 5/2018 | Och | E05B 81/76 |
| 2018/0163442 | A1 * | 6/2018 | Soonthornwinate | E05B 77/12 |
| 2018/0171679 | A1 * | 6/2018 | Im | E05B 81/34 |
| 2018/0171686 | A1 * | 6/2018 | Couto Maquieira | E05B 85/107 |
| 2018/0187459 | A1 * | 7/2018 | Yokota | E05B 79/20 |
| 2018/0215345 | A1 * | 8/2018 | Elangovan | B60R 25/01 |
| 2018/0216371 | A1 * | 8/2018 | Patel | E05B 81/76 |
| 2018/0216373 | A1 * | 8/2018 | Torkowski | E05B 79/06 |
| 2018/0230716 | A1 * | 8/2018 | Schiffer | E05B 77/10 |
| 2018/0230718 | A1 * | 8/2018 | Menke | E05B 63/244 |
| 2018/0246508 | A1 * | 8/2018 | Choi | B60R 25/24 |
| 2018/0252007 | A1 * | 9/2018 | Krause | E05B 63/24 |
| 2018/0252009 | A1 * | 9/2018 | Porada | E05B 85/107 |
| 2018/0258671 | A1 * | 9/2018 | Graute | E05B 81/42 |
| 2018/0266150 | A1 * | 9/2018 | Nottebaum | E05B 81/16 |
| 2018/0268629 | A1 * | 9/2018 | Jain | G07C 9/00111 |
| 2018/0304856 | A1 * | 10/2018 | Szczepaniak | G07C 9/00 |
| 2019/0024422 | A1 * | 1/2019 | Inan | E05B 77/12 |
| 2019/0039572 | A1 * | 2/2019 | Tani | B60R 25/31 |

FOREIGN PATENT DOCUMENTS

| | | | |
|---|---|---|---|
| EP | 2 730 730 A2 | 5/2014 | |
| GB | 2492231 A * | 12/2012 | .......... E05B 85/103 |
| WO | WO 2012/021782 A2 | 2/2012 | |

OTHER PUBLICATIONS

International Search Report of International Application No. PCT/EP2015/061222, dated Sep. 4, 2015, 4 pages.

* cited by examiner

LOCK SYSTEM FOR A MOTOR VEHICLE

BACKGROUND

The invention relates to a lock system for a motor vehicle, having a handle for opening a door or hatch of the motor vehicle, a drive device, a control device, which is suited for checking an access code of a mobile ID transmitter, and a lock device for the door or the hatch, wherein the handle is designed such that it can be moved between a non-use position, in which it is flush with the outer contour of the door or hatch, and an opening position, in which it protrudes, at least in part, from the outer contour.

Lock systems of the type specified above are known from the prior art, and have a handle assembly with a handle. With these known lock systems, when the handle is in its non-use position, it is retracted to where it lies flush with outer contour of a door. The handle can be moved out of its sunken position via a signal, which is triggered, for example, through actuation of a push button. Because of this countersinking, however, the handle in this known lock system suffers with respect to ergonomics, such that it may be difficult to actuate, and hard to grasp, thus reducing the overall practicality of the lock system.

Furthermore, lock systems are known from the prior art in which a cinching device for a force actuation of a lock device is provided, in order to support a user of the motor vehicle when closing a door or hatch counter to the force of a sealing profile. Normally, the cinching device transfers the door or hatch from its preliminary latching position into the primary latching position, and acts against the force of the door seal. In addition, opening devices are also known, which open or release the associated door or hatch by means of a motor in an opening procedure, such that a user can easily open the door or hatch, without having to pull on an outer door handle, for example.

Such known cinching/opening devices must take into account the large sealing counter forces exerted by the door or hatch seals, wherein these large sealing counter forces must be overcome when closing the door or hatch. When opening the door or hatch, these forces must be counteracted in order to prevent an undesired noise when the rubber seal is abruptly released, and to bring the door or hatch into the preliminary latching position from the primary latching position with a certain delay. It is apparent that such cinching/opening devices on the whole drive up the costs for a lock system.

The fundamental object of the invention is to create a solution, which provides a lock system in a structurally simple manner, which can be produced inexpensively, and increases the user convenience.

BRIEF SUMMARY

This object is achieved by a lock system for a motor vehicle in accordance with Claim 1.

The lock system for a motor vehicle according to the invention has a handle for opening a door or hatch of the motor vehicle, a drive device coupled to the handle, a control device coupled to the drive device, suited for checking an access code of a mobile ID transmitter, and a lock device for the door or hatch, wherein the handle is designed such that it can be moved between a non-use position, in which it is flush with the outer contour of the door or handle, and an opening position, in which it protrudes, at least in part, from the outer contour, wherein the drive device for opening or closing the door or hatch is coupled and designed such that it moves along a movement path when the door is opened or closed, along which the drive device both extends the handle into its opening position, or retracts it into its non-use position, as well as actuating the lock system.

Advantageous and useful designs and developments of the invention can be derived from the dependent Claims.

A lock system for a motor vehicle is provided by the invention, which is distinguished by a functional and efficient coupling of components, and has a simple and inexpensive construction. In accordance with the invention, the control device directs a signal to the control device, which is coupled to the activation device, when its check has established that the access code is from an authenticated ID transmitter. A sensor device for a passive entry system is provided thereby, which triggers an ID transmitter in its proximity, such that the ID transmitter sends its access code to the control system of the lock system, where it is checked regarding its authenticity. Alternatively to a sensor device, a receiver can also be provided, which receives an access code from a mobile ID transmitter, wherein here, a user must actuate the ID transmitter in order for it to transmit the access code. The receiver then sends the received access code to the control device, where it is checked in terms of its authenticity. Independently of whether a sensor device or a receiver is provided, an authenticated access code, or authenticated ID transmitter prompts the control device to activate the drive device, such that the drive device moves. As a result, the now moving drive device, which moves along its movement path, moves the handle from the non-use position into the opening position, in which the door or hatch protrudes out of the outer contour, in order that a user, for example, can grasp the handle in order to actuate it. The coupling between the control device and the drive device serves, as a result, due to an acknowledged, authenticated user, to move the drive device, such that it extends the handle, in order that the authenticated user can operate it, or actuate a button attached thereto. As a result of the operation or actuation, the drive device receives a return signal, upon which it moves further along its movement path, resulting in the drive device actuating the lock device. Consequently, manual force on the part of the user is no longer necessary in order to open the door or hatch, because the drive device assumes the task of opening the lock device in the manner of an electronic lock. When closing, on the other hand, the drive device acts as a cinching aid, such that in an advantageous manner, the force resulting from the compression of the door or hatch seal can be overcome, without a user having to exert this force. Consequently, in the lock system according to the invention, a single drive device assumes the functions of retracting and extending the handle, and also the opening and cinching of the lock device, while in the prior art, two separate, independently functioning drives are necessary. Another advantage of the invention is that the design of the lock system requires very little structural space. The drive device causes both the retraction and extension of the handle, as well as the actuation of the lock device along the one single movement path, having an advantageous impact on the structural space.

In terms of its design, the invention provides that the drive device moves from a home position into a second operating position, via a first operating position when moving along the movement path, and wherein the drive device moves the handle from the non-use position into the opening position, or from the opening position into the non-use position when moving between the home position and the first operating position, and is designed to actuate the lock device when moving between the first operating position and the second operating position. The movement path of the drive device is consequently designed such that a logical sequence of the procedures during opening, i.e. extending the handle and subsequently actuating the lock device accordingly, and during closing, i.e. retracting the handle, and subsequently cinching the lock device, are effected by the drive device.

In other words, it is advantageous in the design of the invention when the drive device moves along the movement path from a home position into a second operating position via a first operating position, and wherein the handle is disposed in the non-use position when it is in the home position, it retains the handle in the opening position when the drive device is in the first operating position, and it retains the handle in the opening position, as well as actuating the lock device, when the drive device is in the second operating position. The drive device consequently effects two functions when it is in the second operating position, because it retains the handle in the opening position, and simultaneously causes and/or activates the opening of the lock device.

One design of the lock system according to the invention provides for another advantageous coupling, in that the handle and the drive device are coupled such that an actuation of the handle into the opening position activates the drive device, such that the drive device moves from the first operating position into the second operating position, and such that the drive device releases the lock device when it moves into the second operating position.

For a particularly efficient exchange of data, the invention provides in its design that a sensor device is provided, which is designed to activate a mobile ID transmitter, wherein the activation of the ID transmitter effects a transmission of an access code from the ID transmitter to the control device, and the control device and the drive device are coupled, such that the control device activates the drive device such that it moves from the home position into the first operating position when an ID transmitter has been authenticated.

Furthermore, it is advantageous in the design of the invention when the sensor device is designed as a capacitive sensor. Alternatively to a capacitive sensor, an inductive sensor can also be used. Both types of sensor are available in the market, and provided with appropriate circuitry guidelines.

Alternatively, for a particularly efficient data exchange, the invention provides in its design that a receiver coupled to the control device is provided, which receives an access code from a mobile ID transmitter, and transmits it to the control device for an authentication test, wherein the control device and the drive device are coupled such that the control device activates the drive device such that it moves from the home position into the first operating position, when an ID transmitter has been authenticated. The receiver can be a part of the control device itself thereby, but this is not necessary.

A particularly compact lock system can be obtained in the design of the invention, in that the sensor device or the receiver is accommodated and disposed in the handle. By way of example, capacitive sensors are formed by metal surfaces in the interior of the handle for the design as a sensor device, which are coupled to appropriate charging electronics. In this manner, a very compact handle can be obtained. However, a design in the form of a receiver can also be disposed and accommodated inside the handle in an advantageously space saving manner.

With regard to a compact lock system that requires little installation space, it is advantageous when the drive device is designed as an actuator in the form of a gearwheel drive, or an actuator in the form of a toothed rack that interacts with a gearwheel. Both designs allow for a sequential processing and execution of the various settings and positions.

One design according to the invention, however, requires the smallest installation space, in which the drive device is designed as an actuator in the form of an eccentric cam, which deflects a lever that is actively connected to the handle when it is moved from the home position into the first operating position, the deflection of which causes a movement of the handle into the opening position.

Lastly, it is provided in the design of the invention, that the drive device comprises a motorized drive. An electric motor drive is of particular interest here, which is efficient, small, and light.

It is to be understood that the features specified above, and to be explained below, can be used not only in the respective given combinations, but also in other combinations, or in and of themselves, without abandoning the scope of the invention. The scope of the invention is defined only by the Claims.

BRIEF DESCRIPTION OF THE DRAWINGS

Further details, features and advantages of the invention can be derived from the following description, in conjunction with the drawings, in which a preferred exemplary embodiment of the invention is depicted by way of example. Therein.

DETAILED DESCRIPTION

Figure 1:
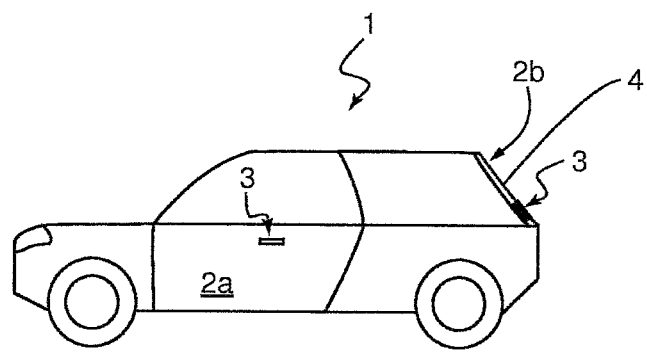
FIG. 1 shows a side view of a motor vehicle having the lock system according to the invention.

A motor vehicle 1 in the form of an automobile is depicted by way of example in FIG. 1, which has a door 2a and a hatch 2b in the example, which can be opened by means of a respective handle 3. A respective handle 3 is designed such that it can be moved between a non-use position and an opening position, wherein the handle 3 is flush with the outer contour 4 of the door 2a or the hatch 2b when it is in the non-use position, and protrudes at least in part from the outer contour 4 when it is in its opening position, in order that a user can grasp it, for example, with his hand.

Figure 2:
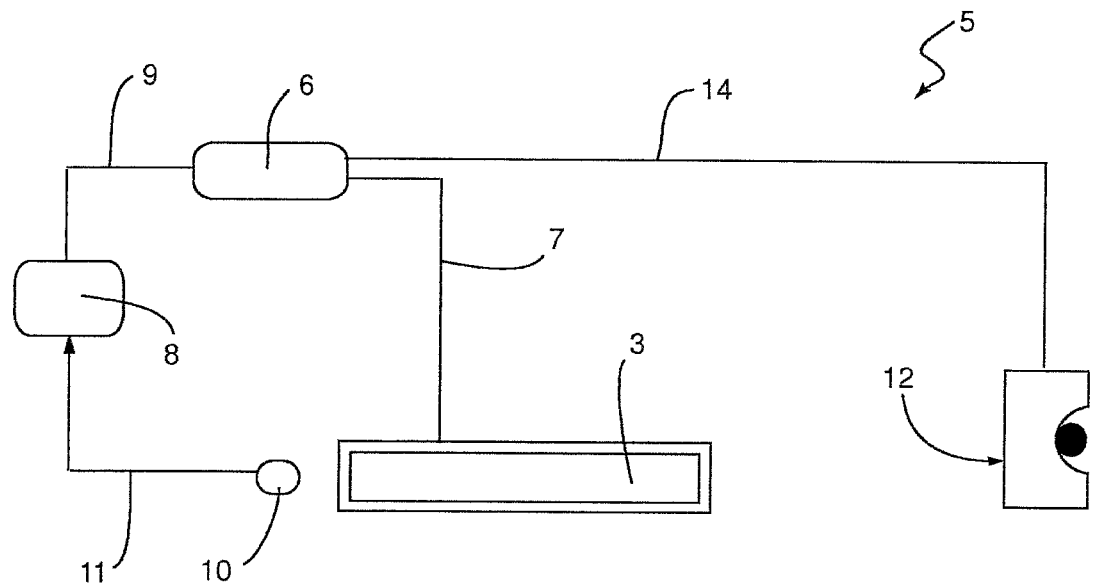
FIG. 2 shows an exemplary functional diagram of the lock system, in the manner of a circuit diagram.

A functional diagram of a lock system 5 according to the invention for the motor vehicle 1 is shown schematically in FIG. 2. The lock system 5 is integrated in the door 2a or hatch 2b of the motor vehicle 1, and comprises a handle 3 for opening the door 2a or hatch 2b of the motor vehicle 1, a drive device 6 coupled to the handle 3 via a first coupling 7, a control device 8 coupled to the drive device 6 via a second coupling 9, a receiver 10 coupled to the control device 8 via a third coupling 11, and a lock device 12 for the door 2a or hatch 2b. The receiver 10 is depicted in FIG. 2 merely by way of example, and can alternatively also be designed as a sensor device, in which the third coupling 11 is then omitted. The receiver 10 receives an access code, which is transmitted as a result of an (active) actuation of a key or ID transmitter by a user, and relays the received access code to the control device 8, which checks the authenticity of the received access code. Alternatively to the receiver 10, a sensor device can also be provided, which triggers an ID transmitter in its proximity, such that it then transmits its access code, which in turn is received by the control device, and evaluated or checked with regard to its authenticity. In FIG. 2, the lock device 12 is coupled to the drive device 6 via a fourth coupling 14, wherein the lock device 12 can be designed as a rotary latch lock.

With the lock system 5 according to the invention, first the authentication of an access code from an ID transmitter is checked in the known manner, using the receiver 10. As explained above, with this design of the lock system 5 according to the invention, a user must actively actuate the key or ID transmitter, by means of which the key or the ID transmitter transmits its access code, which is received by the receiver 10, and relayed to the control device 8 via the third coupling 11, where ultimately it is checked whether the access code belongs to the lock system 1 or not. If the control device 8 determines that the received access code is authenticated, the drive device 6 is caused to move by the control device 8 via the second coupling 9, such that the drive device 6 moves along its movement path, from its home position into a first operating position. As a result of this movement of the drive device 6, which is mechanically or electronically coupled to the handle 3, the handle 3 is moved from the non-use position into its opening position, in which it protrudes at least in part from the outer contour of the door 2a or hatch 2b, in order that it can be grasped by a user, for example, in order to manipulate it. A second sensor device, which must be touched by the user, or a button, which must be actuated by an authenticated user, could be provided on the handle 3, in order to open the door 2a or hatch 2b. The user does not need to user manual force to open the door 2a or hatch 2b, but rather, proximity to the second sensor, or an actuation of the button is sufficient. When this proximity or actuation has been obtained, the door 2a or hatch 2b opens, in that the drive device 6 moves from the first operating position into its second operating position. If the door 2a or hatch 2b is not opened through proximity or actuation, the handle 3 is automatically retracted after ten seconds, and an algorithm for checking an access code of a mobile ID transmitter is initiated again, as described above. After the opening procedure, it can then be detected by another sensor whether the door 2a or hatch 2b has been opened and again closed. In particular, such a sensor can detect whether the door 2a or hatch 2b is again in its preliminary latching position. If this is the case, the drive device 6 is returned to its home position, for example, and moved further, in a direction facing away from the first operating position. With this movement, the drive device 6 can pull the door 2a or hatch 2b closed. The drive device 6 can thus function as either an opening aid or a cinching aid, depending on the direction in which it moves from the home position.

Figure 3:
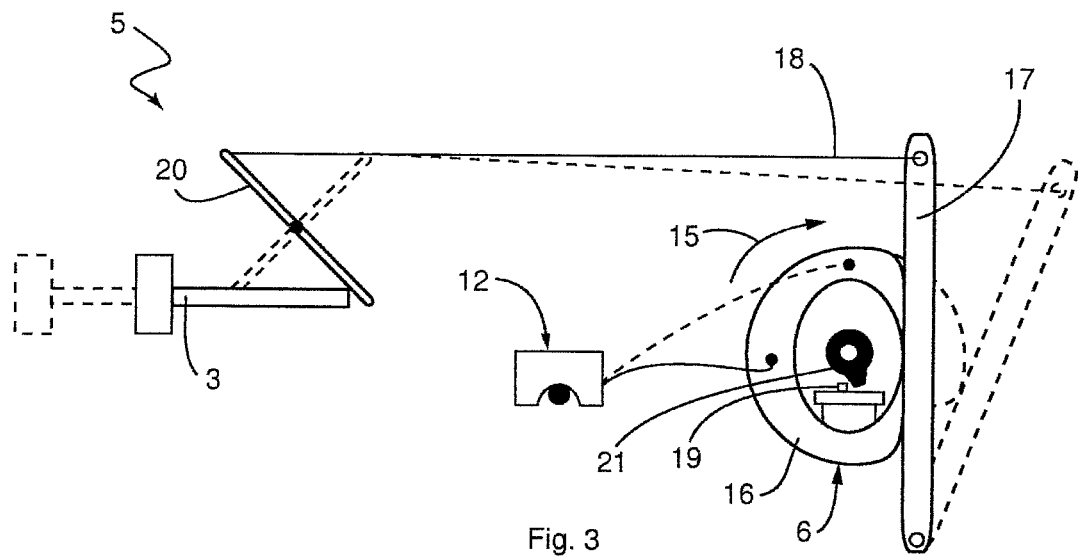
FIG. 3 shows an exemplary embodiment of the lock system according to the invention, in a schematic illustration.

The functioning of the lock system 5 shall be explained in greater detail on the basis of FIG. 3, in which an exemplary embodiment of the lock system 5 according to the invention is depicted schematically. The drive device 6 is coupled and designed such that it moves, with the help of the aforementioned couplings 7, 9, 11, 14, along a movement path (indicated by the arrow 15 in FIG. 3) when opening or closing the door 2a or hatch 2b. The drive device 6 is designed as an actuator in the form of an eccentric cam 16 in FIG. 3, which deflects a lever 17 actively connected to the handle 3 when it is moved from the home position into the first operating position. The lever 17 can be spring loaded, for example, such that it is pressed against the eccentric cam 16 by a spring element pushing it in this direction, and is deflected in accordance with the rotation of the eccentric cam 16. The deflection of the lever 17 then causes a movement of the handle 3 into the opening position. The opening position is indicated in FIG. 3 by the broken line, while the non-use position is indicated by the continuous line. Alternatively to the design as an eccentric cam 16, the drive device 6 could also be designed as an actuator in the form of a gearwheel drive or in the form of a geared rack interacting with a gearwheel. In any case, the drive device 6 has a motorized drive, in particular an electric motor drive, for moving the actuator along its movement path 15, and extend or retract the handle and to actuate the lock device 12. The drive device 6 drives the handle 3 into its opening position or out of its non-use position along the movement path 15, which has an elliptical shape in the exemplary embodiment, due to the shape of the eccentric cam 16, and actuates the lock device 12, which is designed as a rotary latch lock in the exemplary embodiment. In the present example, the actuation is the opening of the lock device 12, which occurs electrically or electronically, in the manner of an electric latch, thus a lock in which all of the functions are activated electrically, and requires no manual force on the part of the user. It is of significance for the invention that the drive device 6 moves from a home position into a second operating position via a first operating position when moving the movement path 15. All of the positions lie on the movement path 15, and are successively entered in accordance with the demands of a user. According to the procedural sequence described above by way of example, on the basis of FIG. 2, with regard to the lock system 5, the drive device 6 is designed such that it moves the handle 3 from the non-use position into the opening position, or from the opening position into the non-use position when it moves between the home position and the first operating position, and actuates the lock device 12 when it moves between the first operating position and the second operating position. In particular, the eccentric cam 16 bears on the lever 17 when in the home position, which is connected to a pivot lever 20 that can rotate about a rotational axis via a cable pull system 18, which in turn is coupled to the handle 3. When the drive device 6 is moved out of the home position into the first operating position, the eccentric cam 16 rotates in the direction of the arrow 15 in FIG. 3, and forces the lever 17 into the position indicated by a broken line, due to its eccentricity, by means of which the cable pull system 18 rotates the pivot lever 20, such that ultimately the handle 3 is extended. In order to arrest the movement of the eccentric cam 16, a button 19 is provided in the depicted exemplary embodiment, which is pressed against by a cam element 21 rotating with the eccentric cam 16, when moved from the home position into the first operating position, by means of which the drive device 6 is disengaged from the power source, such that the drive device 6 is stopped. When the eccentric cam 16 is moved further, into the second operating position, the handle 3 remains extended, but the lock device 12 is actuated, in particular opened, at this point by the drive device 6, by means of the fourth coupling 14. In general, the drive device 6 moves along the movement path 15, from the home position into the second operating position, via the first operating position, in order to open the door 2a or hatch 2b, and then, potentially, returned to the first operating position, in order to close the door 2a or hatch 2b (power cinching). In the home position, the handle 3 is disposed in the non-use position, while, when the drive device 6 is in the first operating position, it retains the handle 3 in the opening position. In the second operating position, the handle 3 is still disposed in the opening position, and the drive device 6 actuates the lock device 12.

In order for the drive device 6 to move out of the home position toward the first operating position, the control device 8 and the drive device 6 are coupled via the second coupling 11, when an ID transmitter has been authenticated, such that the control device 8 activates, or supplies power to, the drive device 6 as a result of the received signal, in order to move it out of the home position into the first operating position. The couplings 7, 9, 11, 14 can be designed as electrical connections, in order to transmit signals between the components, or in order to activate a component on the basis of the signal. Furthermore, the handle 3 and the drive device 6 are coupled to one another via the first coupling 7, such that an actuation of the handle 3 into the opening position activates the drive device 6 such that the drive device 6 is moved from the first operating position into the second operating position, and the drive device 6 releases the lock device 12 when it moves into the second operating position.

Consequently, a lock system having a drive device 6 is provided by the invention, which is designed in the manner of an actuator, or an actuating drive, which can be driven into at least three positions (home position, first operating position, and second operating position). In particular, two objectives are accomplished in the second operating position, these being the retention of the handle, which in the non-use position is flush with the door or handle, in its opening position, on one hand, and on the other hand, the actuation lock device 12 as well. This relates to a lock device 12 in which all of the functions are activated electrically. The drive device 6 of the lock system 5 according to the invention thus assumes the functions of retracting and extending the handle 3, and actuating the lock (e.g. the opening or cinching). With a single actuator, it is thus possible to both retract and extend the handle 3, as well as to open and cinch the lock device 12 (cinching aid: power cinching).

The invention described above is not limited, as a matter of course, to the embodiment described and illustrated herein. It is clear that numerous modifications can be made to the embodiment illustrated in the drawings, which are obvious to the person skilled in the art regarding the intended use, without abandoning the scope of the invention thereby. Everything contained in the description and/or illustrated in the drawings, including that which is obvious to the person skilled in the art, deviating from the concrete exemplary embodiment, belongs to the invention.

The invention claimed is:

1. A lock system for a motor vehicle, including a handle for opening a door or hatch of the motor vehicle, a drive device coupled to the handle, a control device coupled to the drive device, and adapted for checking an access code of an associated mobile ID transmitter, and a lock device for the door or hatch, wherein the handle is designed such that it moves between a non-use position, in which it is flush with an outer contour of the door or hatch, and an opening position, in which it protrudes at least in part from the outer contour, wherein the drive device is coupled to the handle and is designed to directly unlatch or latch the door or hatch such that it moves along a movement path, along which the drive device extends the handle into its opening position or retracts it into its non-use position, as well as directly actuates the lock device, wherein the drive device moves from a home position into a second operating position via a first operating position when moving along the movement path, wherein the drive device moves the handle out of the non-use position into the opening position, or from the opening position into the non-use position, when moving between the home position and the first operating position, wherein the drive device directly actuates the lock device when moving between the first operating position and the second operating position, and wherein the handle and the drive device are coupled such that, when the handle is placed into the opening position, an actuation of the handle activates the drive device such that the drive device is moved from the first operating position into the second operating position, and such that the drive device releases the lock device when it moves into the second operating position.

2. The lock system according to claim 1, wherein the drive device moves along the movement path from a home position into a second operating position, via a first operating position, and wherein, in the home position, the handle is disposed in the non-use position, in the first operating position of the drive device, the handle is retained in the opening position, and in the second operating position of the drive device, the handle is retained in the opening position, and the lock device is actuated.

3. The lock system according to claim 1, wherein a sensor device is provided, which is designed such that it activates the associated mobile ID transmitter, wherein the activation of the associated mobile ID transmitter causes a transmission of an access code from the associated mobile ID transmitter to the control device, and the control device and the drive device are coupled such that the control device activates the drive device to execute its movement from the home position into the first operating position, when an authenticated access code has been received.

4. The lock system according to claim 3, wherein the sensor device comprises a capacitive sensor.

5. The lock system according to claim 1, wherein a receiver, that is coupled to the control device, receives an access code transmitted from a mobile ID transmitter, and relays it to the control device for authentication, wherein the control device and the drive device are coupled such that the control device activates the drive device to move it from the home position into the first operating position, when an ID transmitter has been authenticated.

6. The lock system according to claim 5, wherein the sensor device or the receiver is accommodated and disposed in the handle.

7. The lock system according to claim 1, wherein the drive device is designed as an actuator comprising a gearwheel drive.

8. The lock system according to claim 1, wherein the drive device comprises an actuator in the form of an eccentric cam, which deflects a lever actively connected to the handle when moved from the home position into the first operating position, the deflection of which causes a movement of the handle into the opening position.

9. The lock system according to claim 1, wherein the drive device comprises an actuator in the form of a geared rack interacting with a gearwheel.

10. The lock system according to claim 1, wherein the drive device comprises a motorized drive.

* * * * *